United States Patent
Yang (10) Patent No.: US 12,353,709 B2
(45) Date of Patent: Jul. 8, 2025

(54) PROTOCOL FOR SOLID STATE DRIVE WITH HIGH QUALITY OF SERVICE

(71) Applicant: WESTERN DIGITAL TECHNOLOGIES, INC., San Jose, CA (US)

(72) Inventor: Niles Yang, Mountain View, CA (US)

(73) Assignee: Sandisk, Inc., Milpitas, CA (US)

( * ) Notice: Subject to any disclaimer, the term of this patent is extended or adjusted under 35 U.S.C. 154(b) by 90 days.

(21) Appl. No.: 18/232,060

(22) Filed: Aug. 9, 2023

(65) Prior Publication Data
US 2024/0302957 A1    Sep. 12, 2024

Related U.S. Application Data (60) Provisional application No. 63/451,338, filed on Mar. 10, 2023.

(51) Int. Cl.
G06F 3/06       (2006.01)
G06F 12/02      (2006.01)

(52) U.S. Cl.
CPC .......... G06F 3/0604 (2013.01); G06F 3/0634 (2013.01); G06F 3/0679 (2013.01); G06F 12/0253 (2013.01)

(58) Field of Classification Search
CPC ..... G06F 3/0604; G06F 3/0634; G06F 3/0679
See application file for complete search history.

(56) References Cited

U.S. PATENT DOCUMENTS

| | | | |
|---|---|---|---|
| 9,959,049 B1* | 5/2018 | Armangau | G06F 3/0608 |
| 10,409,719 B2 | 9/2019 | Tseng | |
| 10,452,536 B2 | 10/2019 | Parker | |
| 2014/0189207 A1 | 7/2014 | Sinclair et al. | |

(Continued)

FOREIGN PATENT DOCUMENTS

KR        20200065938 A      6/2020

OTHER PUBLICATIONS

Woong Shin, Myeongcheol Kim, Kyudong Kim, and Heon Y. Yeom; Providing QoS through Host Controlled Flash SSD Garbage Collection and Multiple SSDs; 2015, International Conference on Big Data and Smart Computing (BIGCOMP), Feb 9, pp. 111-117. IEEE.

*Primary Examiner* — Sean D Rossiter
(74) *Attorney, Agent, or Firm* — Arlene P. Neal; Neal Blibo LLC

(57) ABSTRACT

A storage device is communicatively coupled to a host that defines a quality of service level for responses transmitted from the storage device to the host. The storage device includes a memory device to store data. The storage device also includes a controller to perform background operations to manage resources on the memory device while performing foreground operations according to the quality of service level set by the host. The controller generates a free block file including information on free blocks in the memory device and transmits the free block file to the host. The host uses the free block file to determine when the memory device is at or near a critical level of block availability and transmits an indication from to the controller. The controller adjusts the priority of the background operations in response to receipt of the indication to maintain the quality of service level.

20 Claims, 9 Drawing Sheets

(56) References Cited

U.S. PATENT DOCUMENTS

| | | | |
|---|---|---|---|
| 2014/0189215 A1* | 7/2014 | Kang | G11C 11/40603 |
| | | | 711/106 |
| 2015/0347295 A1 | 12/2015 | Ihm | |
| 2015/0381729 A1* | 12/2015 | Manohar | H04W 12/033 |
| | | | 709/203 |
| 2016/0092108 A1 | 3/2016 | Karaje et al. | |
| 2016/0246713 A1 | 8/2016 | Choi et al. | |
| 2021/0096761 A1* | 4/2021 | Byun | G06F 3/064 |
| 2021/0133099 A1 | 5/2021 | Muchherla et al. | |
| 2021/0216239 A1 | 7/2021 | Dutta | |
| 2022/0050593 A1 | 2/2022 | Kim | |
| 2022/0121563 A1* | 4/2022 | Kamran | G06F 3/0688 |
| 2022/0413758 A1* | 12/2022 | Prudviraj Gunda | G06F 3/0653 |
| 2023/0384937 A1* | 11/2023 | Lee | G06F 3/0659 |
| 2024/0176506 A1* | 5/2024 | Redaelli | G06F 3/0619 |

* cited by examiner

PROTOCOL FOR SOLID STATE DRIVE WITH HIGH QUALITY OF SERVICE

CROSS-REFERENCE TO RELATED APPLICATION

The present application claims the benefit of U.S. Provisional Application Ser. No. 63/451,338 titled "PROTOCOL FOR SOLID STATE DRIVE WITH HIGH QUALITY OF SERVICE," filed Mar. 10, 2023, which is incorporated by reference herein in their entirety.

BACKGROUND

Non-volatile storage devices, such as solid-state drives (SSD) and the like, may include a memory device for storing data and a controller for managing the internal operations of the storage device. The controller may process foreground operations including, for example, executing instructions such as data read and/or write instructions received from a host. The controller may also process background operations including, for example, executing internal operations to manage the resources on the storage device. In managing the resources of the storage device, the controller may execute relocation functions including compaction, read scrubbing, wear leveling, garbage collection, and the like, to move data from one location to another on the memory device, optimize how space on the memory device is used, and improve efficiency. The host may be unaware of the background operations being carried out on the storage device.

In hyperscale storage devices, the controller may perform frequent foreground operations and the host may expect a high quality of service from the storage device.

For example, the host may expect that the storage device responds to certain operations within a predetermined period. If the foreground operations are competing for the same resources on the storage device as the background operations, quality of service for the foreground operations may suffer. For example, the foreground and background operations may compete for the Random Access Memory (RAM), input/output bandwidth, processing time, and the like, on the storage device. This may also be true for a boot drive where frequent metadata updates may be needed for the entire platform where the storage device is being used.

To address this issue, the controller on some storage devices may interleave foreground operations with background operations. For example, within a five-second period, the controller may perform foreground operations for a certain period (for example, four seconds) and background operations for a certain period (for example, 1 second). In another example, the controller may allocate a percentage (for example, 80%) of the storage device bandwidth for host instructions and may allocate the remaining bandwidth for background operations. Interleaving foreground operations with background operations may lead to inefficient use of the storage device resources because the allocated time and/or bandwidth may be unused if it is not needed when allocated for a given operation, even if it is needed for other operations.

In some instances, the controller may perform command queue skipping and re-arrangement of foreground instructions to set and/or reset priority given to foreground operations. This may cause some host instructions to be carried out more quickly than others and may lead to inconsistency in the performance of the host.

There are instances where data may be stored in most of the space on the memory device and foreground instructions may not be carried out without relocating data on the memory device to free up space. To ensure that the controller can perform background operations in these instances, the controller may leave sufficient space on the memory device to perform garbage collection and other relocation functions when a certain percent of the memory device has data. The controller may also reduce the host access priority and increase the priority given to background operations, thereby degrading the quality of service expected by the host as the controller is trying to free up space on the memory device.

SUMMARY

In some implementations, a storage device is communicatively coupled to a host that defines a quality of service level for responses transmitted from the storage device to the host. The storage device may include a memory device to store data. The storage device may also include a controller to perform background operations to manage resources on the memory device while performing foreground operations according to the quality of service level set by the host. The controller may generate a free block file including information on free blocks in the memory device and transmit the free block file to the host. The host may use the free block file to determine when the memory device is at or near a critical level of block availability and may transmit an indication to the controller. The controller adjusts the priority of the background operations in response to receipt of the indication to maintain the quality of service level.

In some implementations, a method is disclosed for maintaining the quality of service in a storage device including a memory device to store data and a controller.

The storage device is communicatively coupled to a host. The method includes performing background operations, by the controller, to manage resources on the memory device while performing foreground operations according to a predefined quality of service level set by the host. The method also includes generating, by the controller, a free block file including information on free blocks in the memory device and transmitting the free block file to the host. The method further includes receiving, by the controller, an indication from the host when the memory device is at or near a critical level of block availability and adjusting a priority of the background operations in response to receipt of the indication to maintain the predefined quality of service level.

In some implementations, the host includes a first memory to store instructions and data. The host also includes a processor to define the quality of service level for responses received from the storage device. The host may transmit foreground instructions to the storage device to access information in a second memory in the storage device. The host may receive a free block file including information on free blocks in the second memory and may use information in the free block file to determine that the second memory device is at the critical level of block availability at a given time. The host may adjust transmissions of the foreground instructions to the storage device to maintain the quality of service level for responses received from the storage device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

Figure 1A:
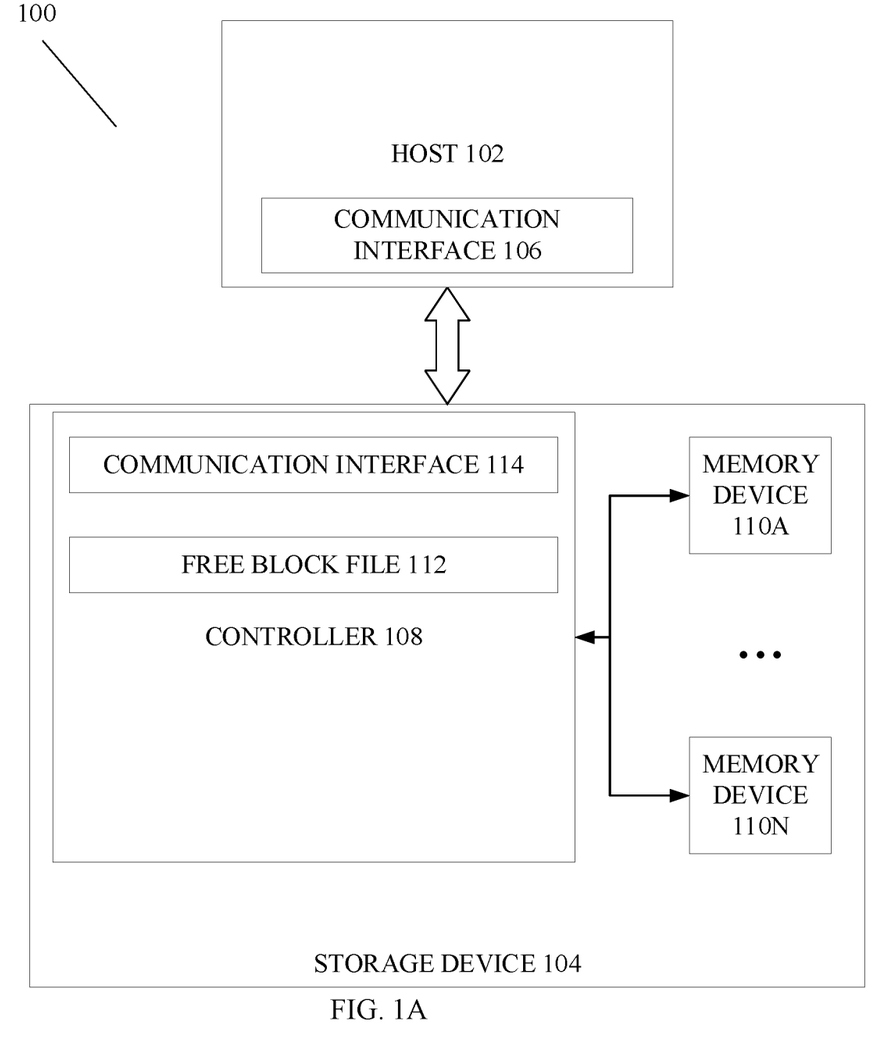
FIGS. 1A and 1B are schematic block diagrams of an example system in accordance with some implementations.
Figure 1B:
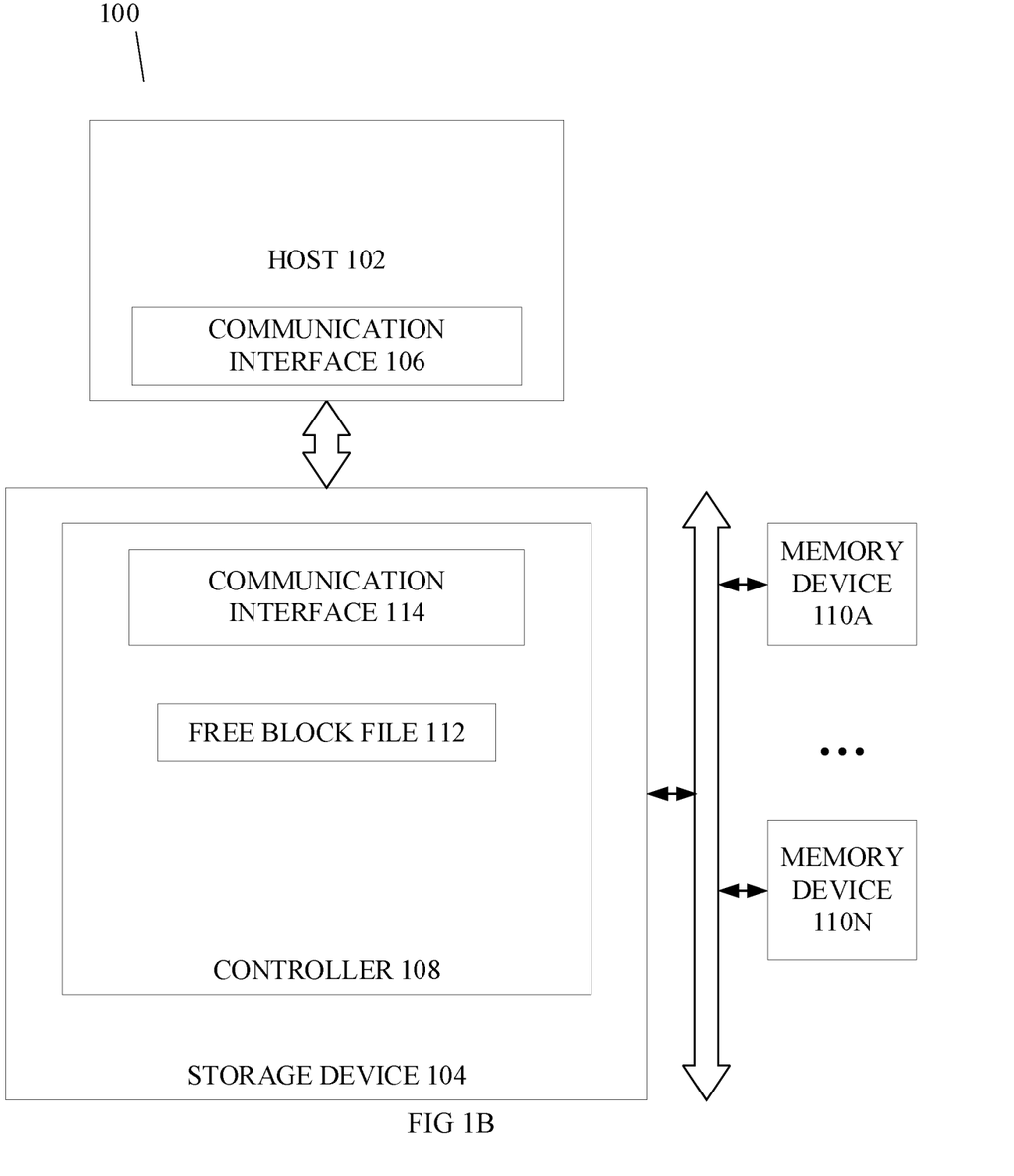

FIGS. 1A and 1B are schematic block diagrams of an example system in accordance with some implementations. System 100 includes a host 102 and a storage device 104. Host 102 and storage device 104 may include communication interfaces 106 and 114 that may include one or more network interfaces to communicatively couple host 102 and storage device 104. For example, host 102 and storage device 104 may communicate via a peripheral component interconnect express (PCI Express or PCIe) with a Non-Volatile Memory Express (NVMe) interface, a Serial Advanced Technology Attachment (SATA) interface, a Parallel Advanced Technology Attachment (PATA) interface, a Small Computer System Interface (SCSI) interface, a Serially Attached SCSI (SAS) interface, a FireWire interface, a Fibre Channel connection interface, a Universal Serial Bus (USB) interface, a PCIe Advanced Switching (PCIe-AS) interface, or the like.

Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a controller 108 and one or more non-volatile memory devices 110a-110n (referred to herein as memory device(s) 110). Storage device 104 may be, for example, a solid-state drive (SSD), and the like. Controller 108 may interface with host 102 and process foreground operations including instructions transmitted from host 102. For example, controller 108 may read data from and/or write to memory device 110 based on instructions received from host 102.

Memory device 110 may be flash based, including, for example, NAND flash memory. Memory device 110 may be included in storage device 104, as shown in FIG. 1A, or may be otherwise communicatively coupled to storage device 104, as shown in FIG. 1B. Data may be stored on memory device 110 in various formats, with the formats being defined by the number of bits that may be stored per memory cell. For example, a single-layer cell (SLC) format may write one bit of information per memory cell, a multi-layer (MLC) format may write two bits of information per memory cell, a triple-layer (TLC) format may write three bits of information per memory cell, and a quadruple-layer cell (QLC) format may write four bits of information per memory cell, and so on. Formats storing fewer bits in each cell are more easily accessed, expensive, durable, and less error-prone than formats storing more bits per cell. As such, controller 108 may store data in the SLC format when, for example, data loss is less tolerable or the data needs to be accessed more quickly.

Cells in memory device 110 may degrade over time and data on memory device 110 may become obsolete. Therefore, controller 108 may also execute background operations to manage resources on memory device 110. For example, controller 108 may monitor memory device 110 and may execute garbage collection and other relocation functions per internal relocation algorithms to refresh and/or relocate the data on memory device 110. While controller 108 is executing the relocation functions, host 102 may continue to transmit instructions to controller 108 to fill up the free blocks on memory device 110.

Data traffic between host 102 and storage device 104 may be executed, for example, per the PCIe with NVMe standard using a doorbell type of command and acknowledgment communication protocol. According to this protocol, host 102 may store commands/instructions to be carried out by storage device 104 in a command queue and controller 108 may transmit an acknowledgment to host 102 upon receiving the command from the command queue and/or executing a command. Host 102 may use this protocol to write data to and/or read data from memory device 110, wherein host 102 may predefine the performance and quality of service level it expects from controller 108 when controller 108 executes instructions received from host 102.

Controller 108 may maintain metadata about storage device 104 including, for example, a free block file 112 with real-time information on the free blocks in memory device 110. Free block file 112 may include a free block count that may identify the percentage and/or amount of the remaining free space on memory device 110. Free block file 112 may include a background command queue count that may identify the size of data to be moved during pending relocation functions in storage device 104. In some instances, the background command queue count may also identify the percentage of the block space in memory device 110 that is needed to execute the pending relocation functions.

In some implementations, controller 108 may maintain free block file 112 as part of its Self-Monitoring, Analysis, and Reporting Technology (SMART) functions. Current SMART monitoring may detect and report various reliability indicators of storage device 104 with the intent of anticipating imminent hardware failures so that preventive action can be taken by host 102 to prevent data loss. In addition to transmitting indications of imminent hardware failure in a SMART file, controller 108 may transmit information in free block file 112 to host 102 for host 102 to determine how much free space is available on memory device 110 at any given time. The free space may be blocks or pages in memory device 110 with no data.

Using the free block file 112, host 102 may determine when memory device 110 is at or near a critical level of block availability. For example, host 102 may determine that memory device 110 is at or near a critical level of block availability when due to insufficient free space on memory device 110, controller 108 may be unable to execute foreground instructions at the predefined quality of service level expected by host 102. In another example, host 102 may use the information in free block file 112 to determine if there is sufficient space on memory device 110 such that controller 108 can execute foreground instructions prior to performing pending relocation functions. Host 102 may thus determine if the quality of service expected from storage device 104 may be degraded because of insufficient space on memory device 110.

In some implementations, host 102 may perform periodic status checks of the availability of blocks on memory device 110 by reading free block file 112. Consider an example where host 102 is transmitting a queue of write instructions to controller 108. Host 102 may monitor free block file 112 to determine the free blocks available on memory device 110 and to determine if controller 108 can execute all or some of the write instructions while meeting predefined quality of service requirements. If based on the information in free block file 112 host 102 determines that memory device 110 is at or near a critical level of block availability and that controller 108 cannot execute foreground operations at the predefined quality of service level, host 102 may adjust the transmissions of foreground instructions. This may enable host 102 to react gradually when free blocks on memory device 110 are limited, without sacrificing the quality of service host 102 expects from controller 108. For example, based on the free block count and the amount of space on memory device 110 needed for pending relocation, host 102 may determine that pending relocation functions may lead to degraded quality of service and host 102 may throttle its instructions to controller 108 and/or divert its instructions to another storage device in the host platform.

In some instances, when memory device 110 is at or close to the critical level of block availability, host 102 may instruct controller 108 to execute instructions in a faster operation mode, wherein the programming speed for data relocation write operations may be increased at a temporary expense of a tolerable Bit Error Rate (BER). This may ensure that quality of service is not degraded when memory device 110 is at or close to the critical level of block availability while controller 108 is executing foreground operations. As resources become available, host 102 and/or controller 108 may refine the data in memory device 110 by re-writing data at a normal program speed and normal BER. Host 102 may allow this increased programming speed for data relocation write operations when the temperature of storage device 104 is lower than a predefined level.

Storage device 104 may perform these processes based on a processor, for example, controller 108 executing software instructions stored by a non-transitory computer-readable medium. As used herein, the term "computer-readable medium" refers to a non-transitory memory device. Software instructions may be read into the memory device from another computer-readable medium or from another device. When executed, software instructions stored in the memory device may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 1 are provided as an example. In practice, host 102 and/or storage device 104 may include additional components, fewer components, different components, or differently arranged components than those shown in FIG. 1. Additionally, or alternatively, a set of components (e.g., one or more components) of host 102 and/or storage device 104 may perform one or more functions described as being performed by another set of components of host 102 and/or storage device 104.

Figure 2A:
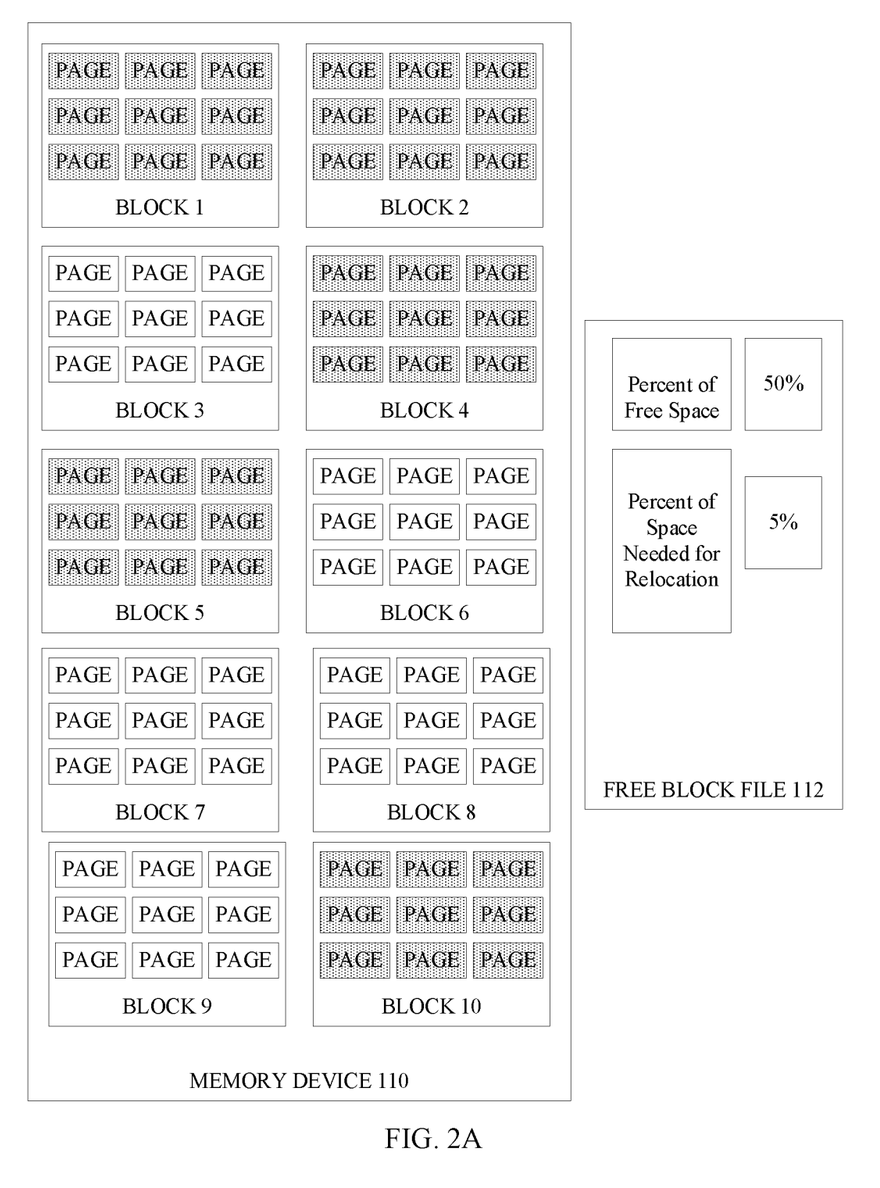
FIGS. 2A-2B are schematic block diagrams of an example memory device and an associated free block file in accordance with some implementations.
Figure 2B:
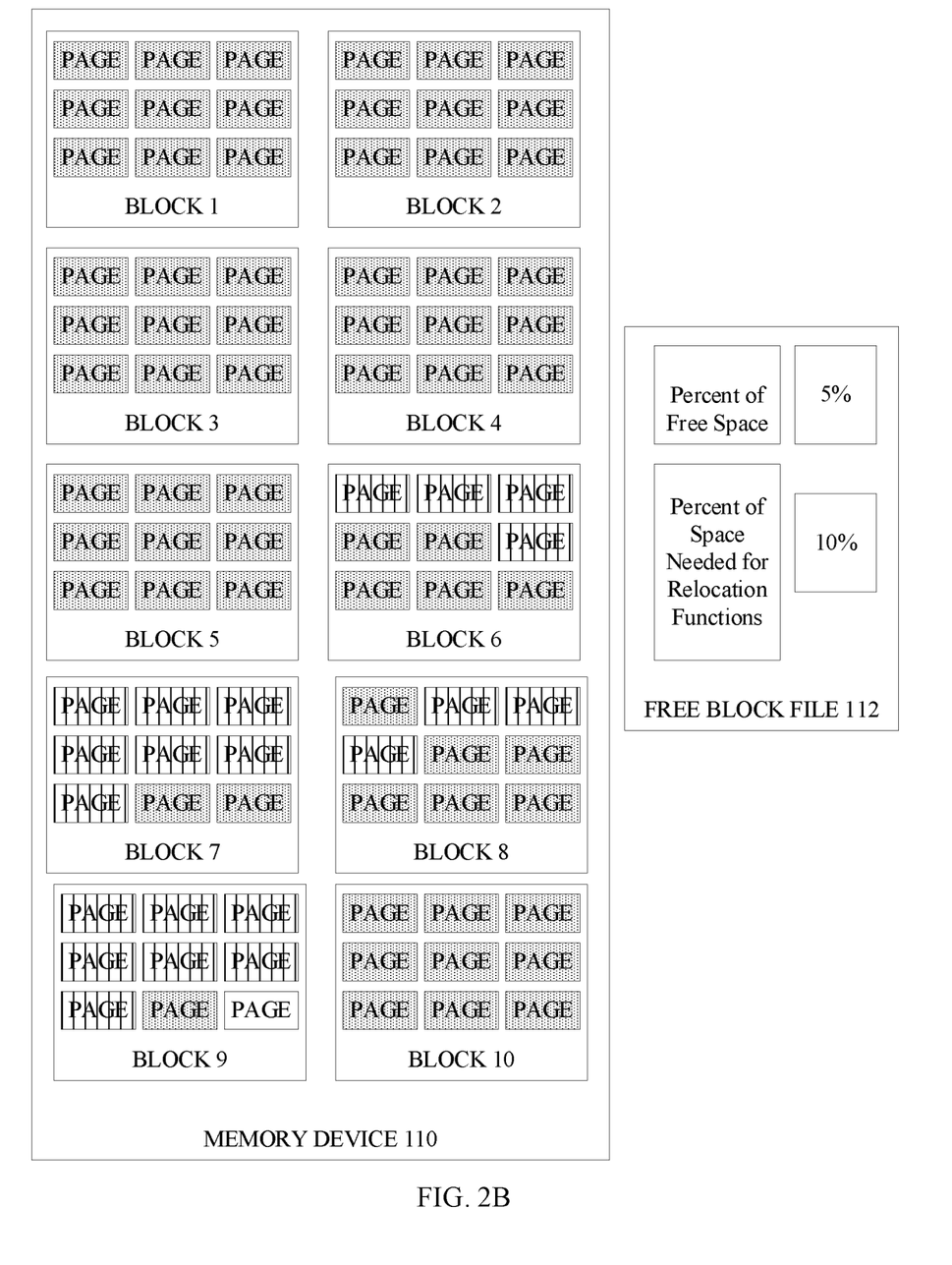

FIGS. 2A-2B are schematic block diagrams of an example memory device and an associated free block file in accordance with some implementations. Consider an example where memory device 110 stores data for an e-commerce platform. Host 102 may transmit read/write instructions to storage device 104 to retrieve and/or store information associated with products on the e-commerce platform. Host 102 may thus expect a high quality of service from storage device 104 so that customers of the e-commerce platform may receive real-time feedback from queries or data entered on the e-commerce platform.

FIG. 2A shows an example of memory device 110 including data for the e-commerce platform. Memory device 110 may include ten blocks divided into pages, with the shaded pages representing locations in memory device 110 that include data. At a first time, free block file 112 may show that fifty percent of the free blocks in memory device 110 have no data and that five percent of the free space in memory device 110 is needed to execute pending relocation functions. If during this time host 102 transmits a write instruction to write data to one percent of the space in memory device 110, host device 102 may determine from free block file 112 that controller 108 may execute the write instruction at the expected quality of service.

FIG. 2B shows another example of memory device 110 including data for the e-commerce platform, wherein memory device 110 includes ten blocks, with the shaded and vertical lined blocks representing locations in memory device 110 that include data at a second time. Blocks with data in memory device 110 may include obsolete information that may be overwritten during background operations. The blocks with obsolete information are shown with vertical lines. Free block file 112 may show that five percent of the free space in memory device 110 has no data and that controller 108 needs ten percent of the space in memory device 110 to execute pending relocation functions. As such, controller 108 may perform relocation functions to free up space in the memory device 110 to execute foreground operations. When host 102 issues a write command to storage device 104 at the second time, based on information on free block file 112, host 102 may determine that with the available space in memory device 110 controller 108 may execute background operations prior to executing the write instructions. Host 102 may thus determine, at the second time, that controller 108 may be unable to execute foreground operations at the predefined quality of service level. Host 102 may then adjust the foreground instructions it sends to storage device 104 to compensate for the pending relocation functions being carried out by controller 108.

If, for example, during the second time host 102 has no pending write requests when host 102 determines that memory device 110 is at or close to the critical level of block availability that may affect quality of service, host 102 may transmit an instruction with a time-idle-for-relocation period to controller 108 prior to transmitting a write instruction. If, for example, host 102 determines that the pending relocation functions can be carried out in 100 milli-seconds, taking into account the size of the data to be relocated and the processing speed of controller 108, host 102 may provide a time-idle-for-relocation period of 100 milli-second to controller 108 and may pause other foreground instruction transmissions to controller 108 during the time-idle-for-relocation period. Host 102 may also instruct controller 108 to prioritize background operations and/or pause executing foreground instructions during the time-idle-for-relocation period. Controller 108 may use the time-idle-for-relocation period to complete the pending relocation functions.

If, for example, during the second time host 102 has pending write requests from the e-commerce platform when host 102 determines that memory device 110 is at or close to the critical level of block availability that may affect quality of service, rather than pausing foreground instructions to controller 108, host 102 may slow down the transmission of foreground instructions to storage device 104 by inserting extra idle time between foreground commands. Controller 108 may execute background instructions during the idle time inserted between the foreground commands.

Host 102 may also pause foreground instructions by reducing the response time during which storage device 104 may respond to a foreground command. For example, instead of predefining the quality of service wherein host 102 expects a response to a foreground command within one second, host 102 may instruct controller 108 to add, for example, a half second to the response time. With the adjusted response time, controller 108 may execute background instructions during the extra time allowed by host 102.

If in another example during the second time, host 102 determines that controller 108 may relocate more data than the data listed in the pending relocation command queue, during periods where host 102 may not need to access data on memory device 110, host 102 may instruct controller 108 to relocate more data than the data in the pending command queue. While host 102 is allowing controller 108 to perform relocation functions, host 102 may periodically examine free block file 112 to determine if the free block count and pending relocation workload are low enough to resume normal foreground instructions to storage device 104.

In an example where host 102 is unable to pause foreground instructions to storage device 104 during the second time, host 102 may divert the workload to another storage device in the host platform. Host 102 may record the quality of service impact statistics to determine which storage device 104 in its platform has impacted quality of service and/or which data is more difficult or easy to access on a storage device in its platform.

Host 102 may also instruct controller 108 to reconfigure certain frequently accessed data when memory device 110 is at or close to the critical level of block availability and thereby reduce future relocation of the reconfigured data. Consider an example where host 102 is accessing prices for items on the e-commerce platform. If host 102 frequently accesses the price of a first item and the price of the first item is infrequently updated, host 102 may issue multiple read instructions to access the same data. If host 102 determines, based on the quality of service impact statistics, that storage device 104 quality of service may be reduced, host 102 may instruct controller 108 to reconfigure where the price for the first item is stored on memory device 110 and reset the internal relocation parameters for relocating the price for the first item. For example, host 102 may instruct controller 108 to store the price for the first item in the SLC format while storing the prices for other items that are accessed less frequently and/or updated more frequently in the TLC or QLC format. This will enable controller 108 to execute read instructions for the price of the first item more quickly and maintain the quality of service. As indicated above FIGS. 2A-2B are provided as examples. Other examples may differ from what is described in FIGS. 2A-2B.

Figure 3:
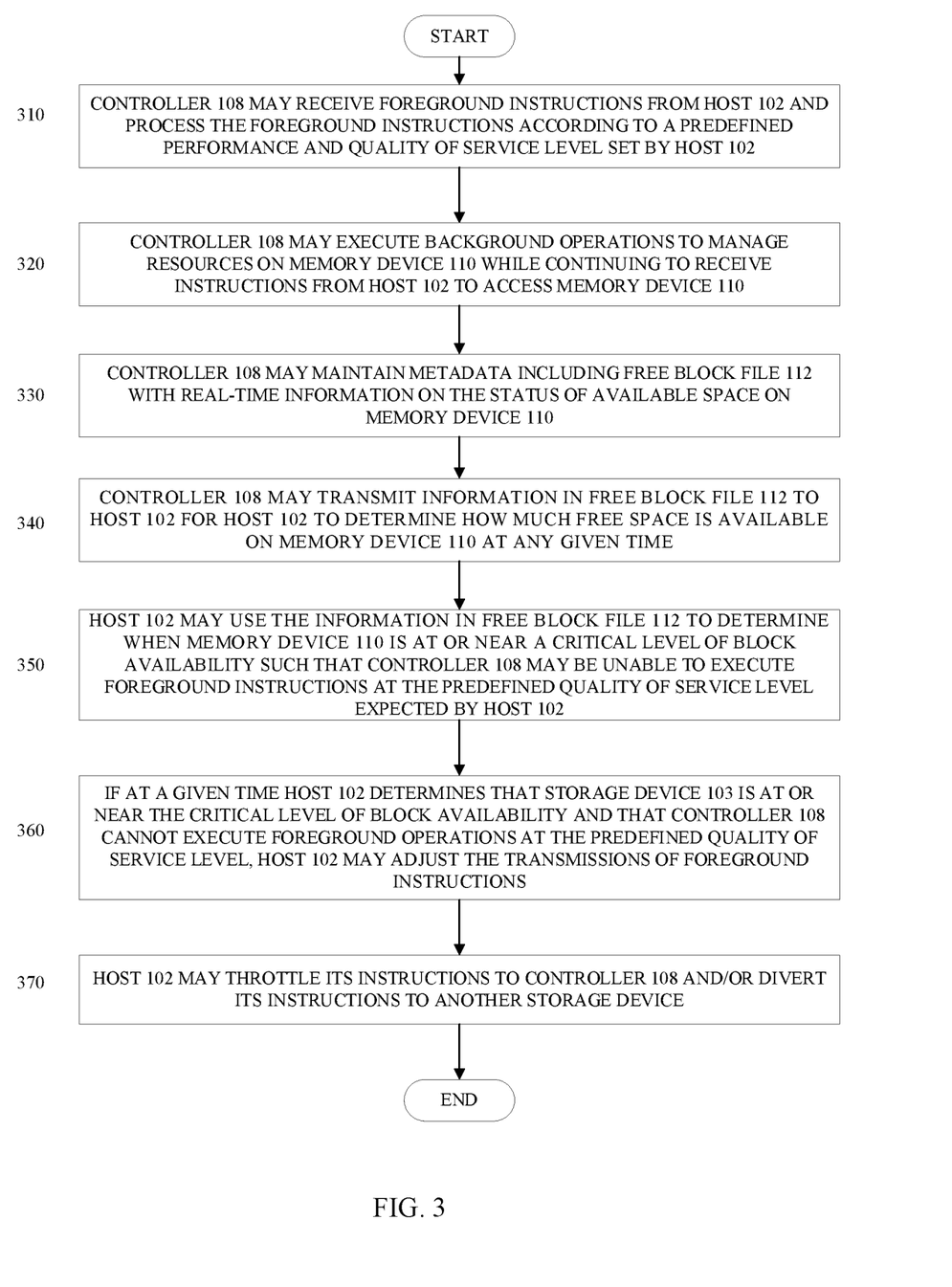
FIG. 3 is a flow diagram of an example process for maintaining quality of service in a storage device with a critical level of block availability in accordance with some implementations.

FIG. 3 is a flow diagram of an example process for maintaining quality of service in a storage device with a critical level of block availability in accordance with some implementations. At 310, controller 108 may receive foreground instructions from host 102 and process the foreground instructions according to a predefined performance and quality of service level set by host 102. At 320, controller 108 may execute background operations to manage resources on memory device 110 while continuing to receive instructions from host 102 to access memory device 110.

At 330, controller 108 may maintain metadata including free block file 112 with real-time information on the status of available space on memory device 110. At 340, controller 108 may transmit information in free block file 112 to host 102 for host 102 to determine how much free space is available on memory device 110 at any given time. At 350, host 102 may use the information in free block file 112 to determine when memory device 110 is at or near a critical level of block availability such that controller 108 may be unable to execute foreground instructions at the predefined quality of service level expected by host 102. At 360, if host 102 determines that storage device 104 is at or near the critical level of block availability and that controller 108 cannot execute foreground operations at the predefined quality of service level, host 102 may adjust the transmissions of foreground instructions. At 370, host 102 may throttle its instructions to controller 108 and/or divert its instructions to another storage device.

Figure 4A:
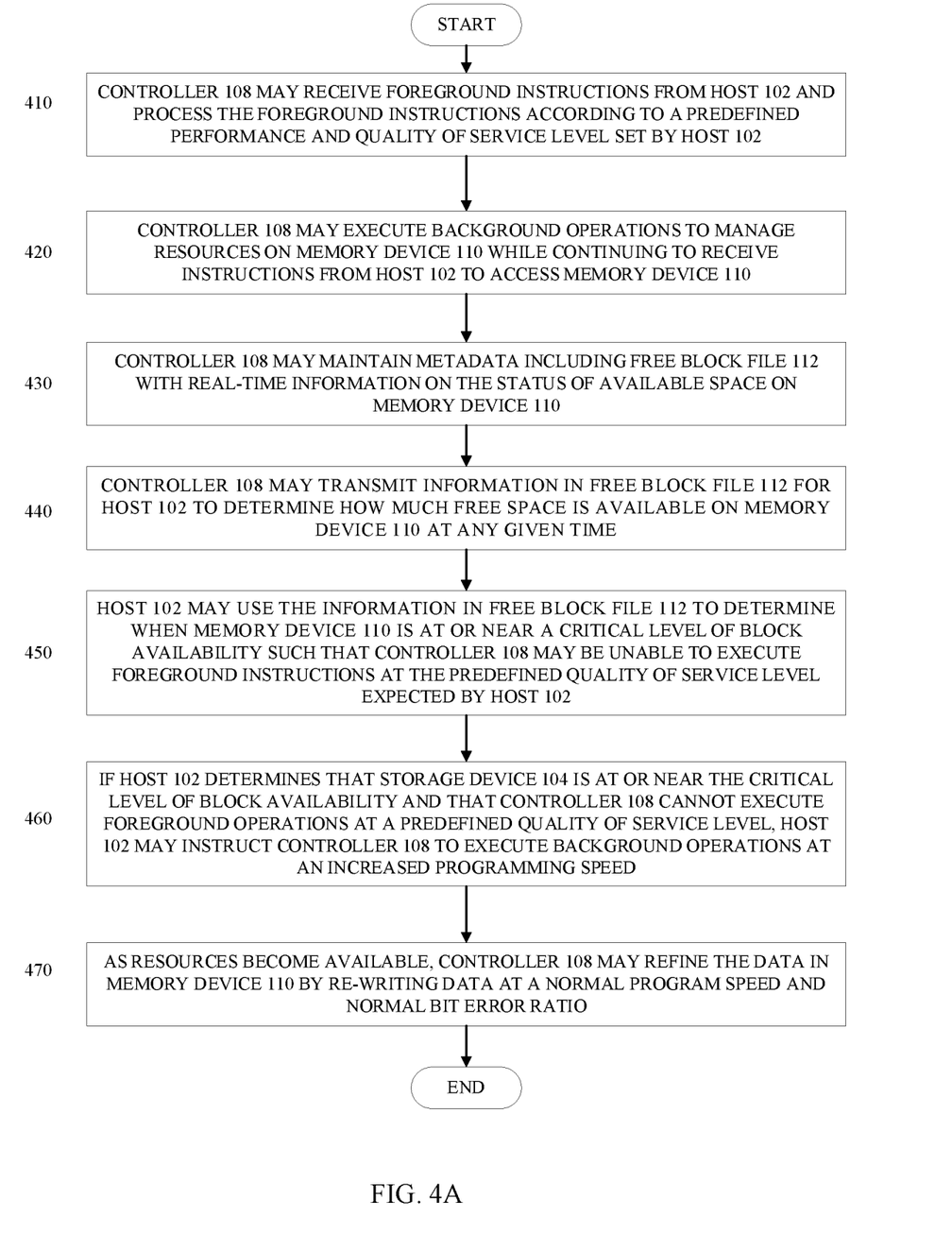
FIGS. 4A-4B are flow diagrams of example processes for maintaining quality of service in a storage device at a critical level of block availability in accordance with some implementations.

FIG. 4A is a flow diagram of an example process for maintaining quality of service in a storage device with a critical level of block availability in accordance with some implementations. At 410, controller 108 may receive foreground instructions from host 102 and process the foreground instructions according to a predefined performance and quality of service level set by host 102. At 420, controller 108 may execute background operations to manage resources on memory device 110 while continuing to receive instructions from host 102 to access memory device 110.

At 430, controller 108 may maintain metadata including free block file 112 with real-time information on the status of available space on memory device 110. At 440, controller 108 may transmit information in free block file 112 for host 102 to determine how much free space is available on memory device 110 at any given time. At 450, host 102 may use the information in free block file 112 to determine when memory device 110 is at or near a critical level of block availability such that controller 108 may be unable to execute foreground instructions at the predefined quality of service level expected by host 102.

At 460, if host 102 determines that storage device 104 is at or near the critical level of block availability and that controller 108 cannot execute foreground operations at a predefined quality of service level, host 102 may instruct controller 108 to execute background operations at an increased programming speed. At 470, as resources become available, controller 108 may refine the data in memory device 110 by re-writing data at a normal program speed and normal bit error ratio.

Figure 4B:
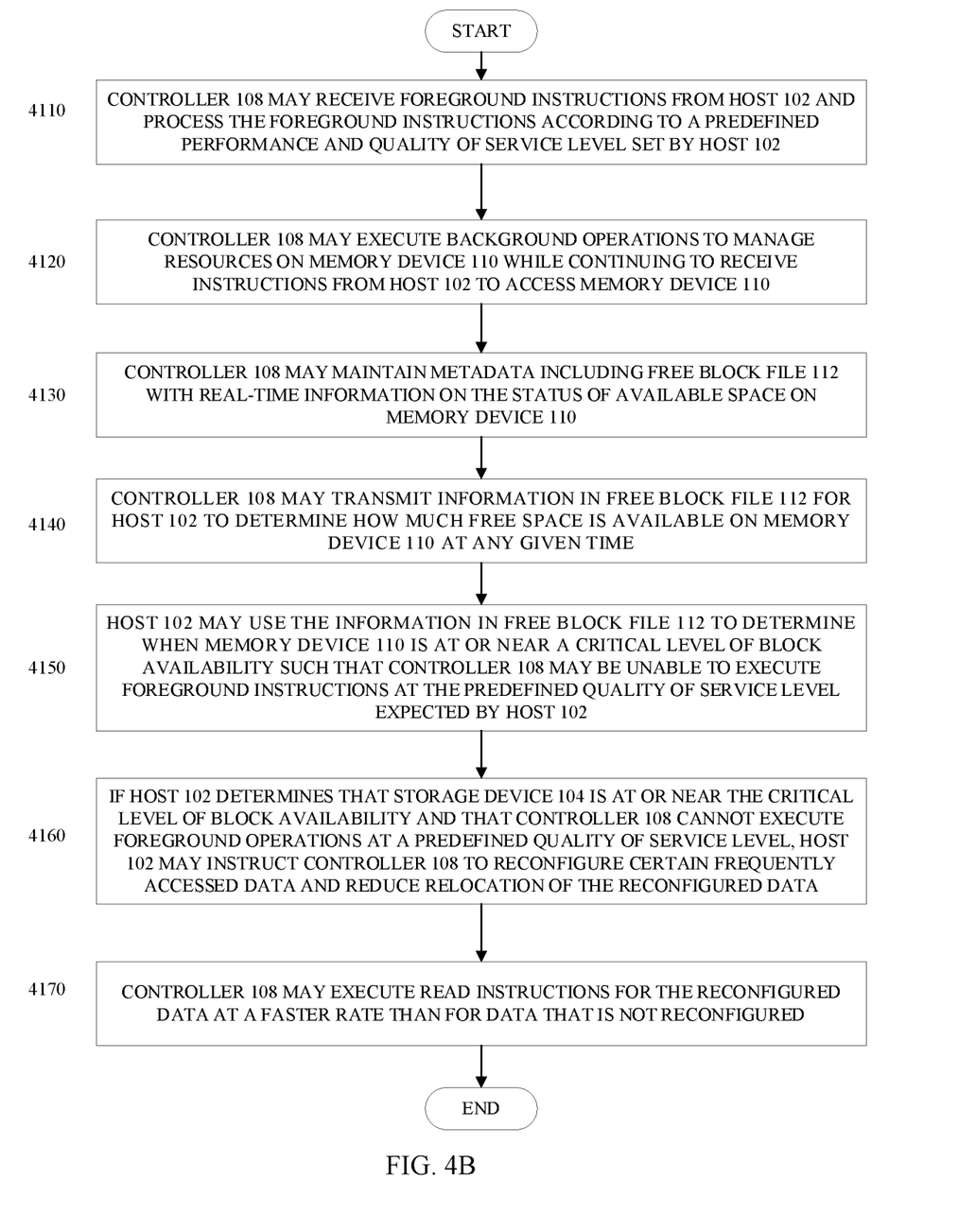

FIG. 4B is a flow diagram of an example process for maintaining quality of service in a storage device with a critical level of block availability in accordance with some implementations. At 4110, controller 108 may receive foreground instructions from host 102 and process the foreground instructions according to a predefined performance and quality of service level set by host 102. At 4120, controller 108 may execute background operations to manage resources on memory device 110 while continuing to receive instructions from host 102 to access memory device 110.

At 4130, controller 108 may maintain metadata including free block file 112 with real-time information on the status of available space on memory device 110. At 4140, controller 108 may transmit information in free block file 112 for host 102 to determine how much free space is available on memory device 110 at any given time. At 4150, host 102 may use the information in free block file 112 to determine when memory device 110 is at or near a critical level of block availability such that controller 108 may be unable to execute foreground instructions at the predefined quality of service level expected by host 102.

At 4160, if host 102 determines that storage device 104 is at or near the critical level of block availability and that controller 108 cannot execute foreground operations at a predefined quality of service level, host 102 may instruct controller 108 to reconfigure certain frequently accessed data and reduce relocation of the reconfigured data. At 4170, controller 108 may execute read instructions for the reconfigured data at a faster rate than for data that is not reconfigured.

Figure 5:
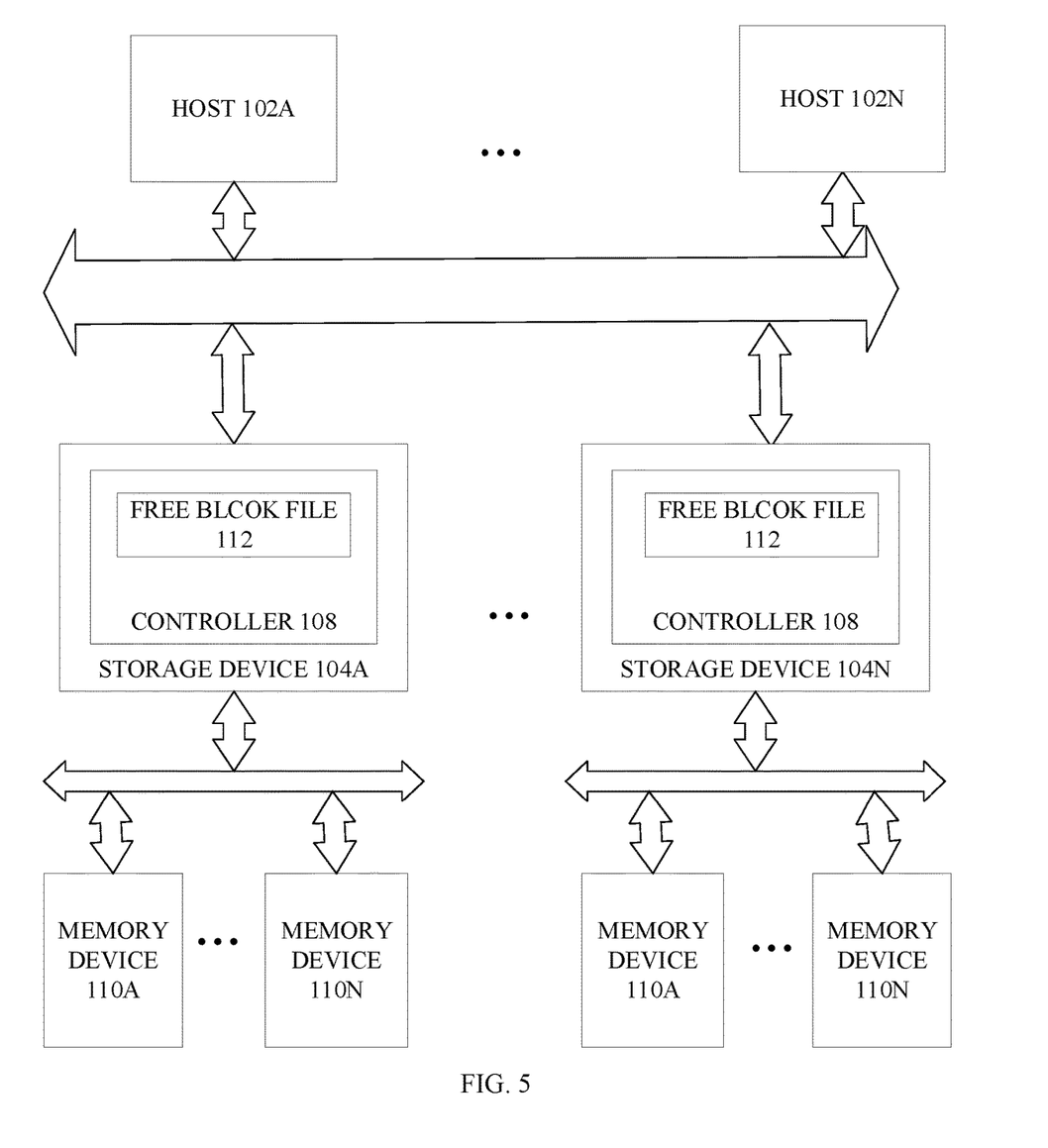
FIG. 5 is a diagram of an example environment in which systems and/or methods described herein are implemented.

FIG. 5 is a diagram of an example environment in which systems and/or methods described herein are implemented. As shown in FIG. 5, environment 500 may include hosts 102-102*n* (referred to herein as host(s) 102), and storage devices 104*a*-104*n* (referred to herein as storage device(s) 104).

Storage device 104 may include a controller 108 to manage the resources on storage device 104. Controller 108 may generate free block file 112 and host 102 may access free block file 112 to determine the space available on memory devices 110 associated with a storage device 104. Host 102 may also use information stored in free block file 112 to determine if controller 108 can execute foreground instructions without compromising quality of service because of the available space on memory device 110 associated with storage device 104. Host 102 may transfer foreground instructions from a first storage device, for example, storage device 104*a*, to a second storage device, for example, storage device 104*c*, if host 102 determines that based on the available space on memory devices 110 associated with storage device 104*a*, storage device 104*a* may not execute foreground instructions at a predefined quality of service level. Hosts 102 and storage devices 104 may communicate via a PCIe with NVMe interface, a SATA interface, a PATA interface, a SCSI interface, a SAS interface, a FireWire interface, a Fibre Channel connection interface, or the like.

Environment 500 may enable improvements in application performance and/or infrastructure efficiency through the integration of free block file 112 in directing instructions to storage devices 104. Environment 500 may also enable parallel computation and/or alleviate constraints on existing processing, memory, storage, and input/output.

Devices of environment 500 may interconnect via wired connections, wireless connections, or a combination of wired and wireless connections. For example, the network of FIG. 5 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
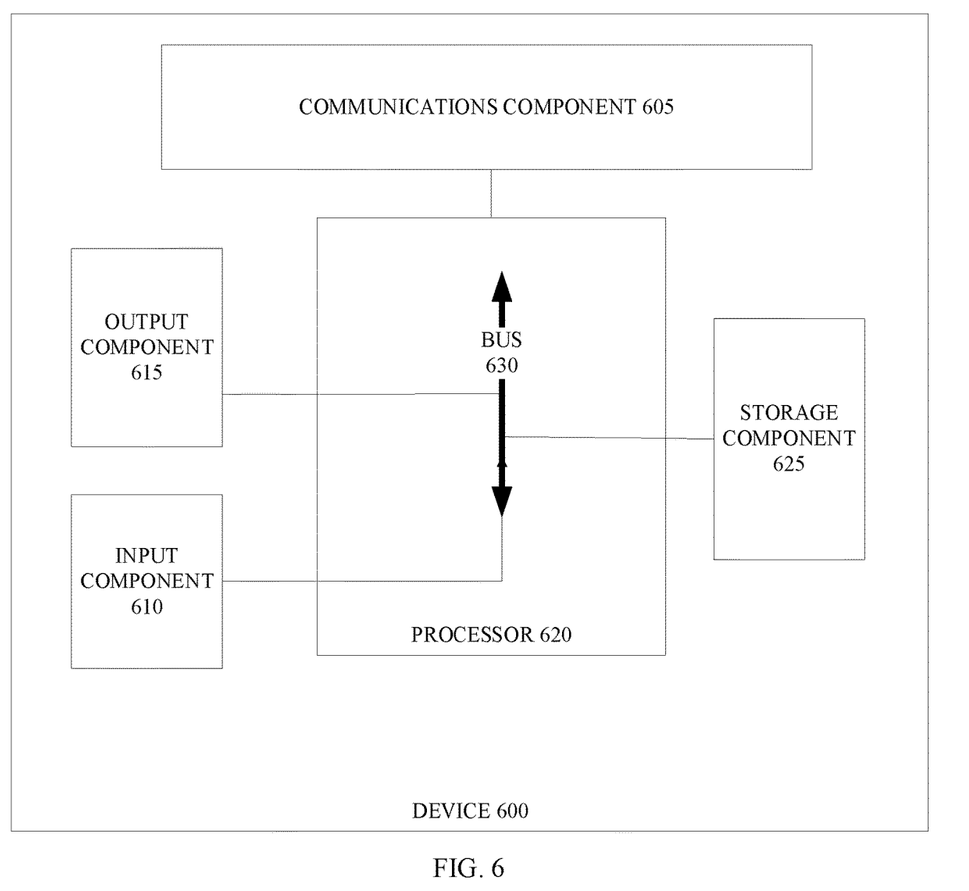
FIG. 6 is a diagram of example components of the host of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, a microphone, and/or a display screen), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and/or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more" The term "only one" or similar language is used where only one item is intended. Further, the phrase "based on" is intended to mean "based, at least in part, on" unless explicitly stated otherwise Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

I claim:

1. A storage device communicatively coupled to a host that defines a quality of service level for responses transmitted from the storage device to the host, the storage device comprising:
 a memory device to store data; and
 a controller:
  to perform background operations to manage resources on the memory device while performing foreground operations according to a defined quality of service level;

to generate a free block file including information on free blocks in the memory device, wherein the free block file includes a free block count and a background command queue count;
to transmit the free block file to the host;
to receive an indication from the host when the memory device is at or near a critical level of block availability; and
to adjust a priority of the background operations in response to receipt of the indication to maintain the defined quality of service level.

2. The storage device of claim 1, wherein the free block count is used to identify remaining free space on the memory device and the background command queue count is used to identify at least one of a size of data to be moved during pending relocation functions in the storage device and a percentage of block space in the memory device to execute the pending relocation functions.

3. The storage device of claim 1, wherein the controller transmits the free block file to the host for the host to one of determine an amount of free space on the memory device or determine when the memory device is at the critical level of block availability at a given time.

4. The storage device of claim 1, wherein the controller executes background instructions in a faster operation mode in response to receipt of the indication.

5. The storage device of claim 1, wherein the indication includes a time-idle-for-relocation period during which the controller prioritizes the background operations.

6. The storage device of claim 1, wherein the indication includes idle time inserted between foreground commands during which the controller executes the background operations.

7. The storage device of claim 1, wherein the indication includes instructions to the controller to add time to when responses to the foreground operations are transmitted from the storage device, wherein the controller executes background operations during added time.

8. The storage device of claim 1, wherein the indication includes instructions to the controller to relocate more data than the data in a pending relocation command queue.

9. The storage device of claim 1, wherein the indication includes instructions to the controller to reconfigure where frequently accessed data is stored in the memory device.

10. A method for maintaining quality of service in a storage device including a memory device to store data and a controller, wherein the storage device is communicatively coupled to a host, the method comprising:
performing background operations, by the controller, to manage resources on the memory device while performing foreground operations according to a predefined quality of service level set by the host;
generating, by the controller, a free block file including information on free blocks in the memory device, wherein the free block file includes a free block count and a background command queue count;
transmitting, by the controller, the free block file to the host;
receiving, by the controller, an indication from the host when the memory device is at or near a critical level of block availability; and
adjusting, by the controller, a priority of the background operations in response to receipt of the indication to maintain the predefined quality of service level.

11. The method of claim 10, wherein the generating comprises storing, in the free block file, the free block count to identify remaining free space on the memory device and the background command queue count to identify at least one of a size of data to be moved during pending relocation functions in the storage device and a percentage of block space in the memory device to execute the pending relocation functions.

12. The method of claim 10, wherein the adjusting comprises executing background instructions in a faster operation mode in response to receipt of the indication.

13. The method of claim 10, wherein the adjusting comprises prioritizing the background operations during a time-idle-for-relocation period included in the indication.

14. The method of claim 10, wherein the adjusting comprises executing the background operations during idle time inserted between foreground commands.

15. The method of claim 10, wherein the adjusting comprises adding time to when responses to the foreground operations are transmitted from the storage device and executing background operations during added time.

16. The method of claim 10, wherein the adjusting comprises relocating more data than data in a pending relocation command queue.

17. The method of claim 10, wherein the adjusting comprises reconfiguring where frequently accessed data is stored in the memory device.

18. A host device communicatively coupled to a storage device, the host device comprising:
a first memory to store instructions and data on the host device; and
a processor to:
defined a quality of service level for responses received from the storage device;
transmit foreground instructions to the storage device to access information in a second memory device communicatively coupled to the storage device;
receive a free block file including information on free blocks in the second memory device, wherein the free block file includes a free block count and a background command queue count;
use information in the free block file to determine that the second memory device is at a critical level of block availability at a given time; and
adjust transmissions of the foreground instructions to the storage device to maintain the quality of service level for responses received from the storage device.

19. The host device of claim 18, wherein the host device adjusts transmissions of the foreground instructions to the storage device by one of throttling instructions to the storage device or diverting instructions to another storage device.

20. The host device of claim 18, wherein the host device adjusts transmissions of the foreground instructions to the storage device by instructing the storage device to execute background instructions in a faster operation mode.

* * * * *